(12) United States Patent
Castro et al.

(10) Patent No.: US 10,004,249 B2
(45) Date of Patent: Jun. 26, 2018

(54) COFFEE COMPOSITION

(75) Inventors: Jennifer Ann Castro, Putnam Valley, NY (US); Cheong K. Fong, Mount Kisco, NY (US)

(73) Assignee: Kraft Foods Group Brands LLC, Chicago, IL (US)

(*) Notice: Subject to any disclaimer, the term of this patent is extended or adjusted under 35 U.S.C. 154(b) by 726 days.

(21) Appl. No.: 12/730,483

(22) Filed: Mar. 24, 2010

(65) Prior Publication Data
US 2010/0247716 A1  Sep. 30, 2010

Related U.S. Application Data

(60) Provisional application No. 61/164,056, filed on Mar. 27, 2009.

(51) Int. Cl.
*A23F 5/14* (2006.01)

(52) U.S. Cl.
CPC ..................................... *A23F 5/14* (2013.01)

(58) Field of Classification Search
CPC .... A23F 5/10; A23F 5/14; A23F 5/145; A23F 5/46; A23F 5/405; A23F 5/36; A23L 1/0052; A23L 1/0055; A23L 1/1641; A23L 1/364; A23L 1/005; A23L 1/0044; A23L 1/3002; A23L 1/302; A23L 2/52; A23L 1/30; A23L 1/004; A23L 2/39; A23L 2/60; A23V 2200/22
See application file for complete search history.

(56) References Cited

U.S. PATENT DOCUMENTS

| 2,278,473 | A |   | 4/1942  | Musher |
|-----------|---|---|---------|--------|
| 3,261,689 | A |   | 7/1966  | Ponzoni |
| 3,713,842 | A |   | 1/1973  | Lubsen |
| 3,917,858 | A |   | 11/1975 | Bos    |
| 5,474,792 | A | * | 12/1995 | Arora et al. .................. 426/594 |

(Continued)

FOREIGN PATENT DOCUMENTS

| CN | 101272700 A | 9/2008 |
| DE | 2811353 A1  | 9/1979 |

(Continued)

OTHER PUBLICATIONS

Schuck, Pierre, Romain Jeantet and Anne Dolivet, Analytical Methods for Food and Dairy Powders, John Wiley & Sons, Ltd. 2012, pp. 199.*

(Continued)

*Primary Examiner* — Erik Kashnikow
*Assistant Examiner* — Hong T Yoo
(74) *Attorney, Agent, or Firm* — Fitch, Even, Tabin & Flannery, LLP (57) ABSTRACT

The present invention provides a process of producing grains of coated coffee grounds, the process comprising: heating a mixture of a coating composition and coffee grounds to a temperature below the melting point of the coating composition and at which the coating composition forms a coating on at least some of the coffee grounds; and cooling the mixture to provide grains comprising coffee grounds having a coating of the coating composition formed on at least some of the surface of the coffee grounds. The present invention also provides coated ground coffee compositions that may be produced by this method.

15 Claims, 3 Drawing Sheets

(56) References Cited

U.S. PATENT DOCUMENTS

| | | | |
|---|---|---|---|
| 6,841,185 | B2 | 1/2005 | Sargent |
| 2003/0026883 | A1* | 2/2003 | Bunke et al. ............... 426/595 |
| 2003/0077372 | A1* | 4/2003 | Sargent et al. ............. 426/594 |
| 2009/0014018 | A1* | 1/2009 | Sengupta et al. ........... 131/276 |
| 2009/0214719 | A1 | 8/2009 | Gouin et al. |

FOREIGN PATENT DOCUMENTS

| | | | |
|---|---|---|---|
| EP | 0220889 | | 5/1987 |
| EP | 0229920 | | 7/1987 |
| EP | 0646319 | A1 | 10/1993 |
| EP | 0928561 | | 7/1999 |
| EP | 1352570 | A1 | 1/2003 |
| FR | 2662585 | A1 | 12/1991 |
| GB | 2006603 | | 5/1979 |
| JP | 61-078347 | A | 4/1986 |
| JP | 4-071446 | A | 3/1992 |
| JP | 09500021 | A | 1/1997 |
| JP | 09275904 | | 10/1997 |
| JP | 2000-333611 | A | 12/2000 |
| JP | 2000333611 | A * | 12/2000 ............. A23F 5/24 |
| JP | 2005506071 | A | 3/2005 |
| KR | 20020061307 | A | 7/2002 |
| RU | 2 310 334 | C1 | 11/2007 |
| WO | 03032743 | | 4/2003 |
| WO | 20050122780 | | 7/2004 |
| WO | 20050016018 | | 2/2005 |
| WO | WO 2007010396 | A2 * | 1/2007 ............. A23L 1/00 |
| WO | 2008146176 | A2 | 12/2008 |

OTHER PUBLICATIONS

JP200333611 A, Nakagawa et al. Abstract, English.*

Spiller, Gene A. Caffeine, CRC Press Inc. 1998, pp. 85.*

Korean Intellectual Property Office Notice of Preliminary Rejection dated Dec. 20, 2011 regarding Korean Patent Application No. 10-2010-27090.

European Search Report, Application No. 10250614.4 dated Jul. 12, 2010.

P.R. China State Intellectual Property Office First Office Action dated Feb. 15, 2012 for Chinese patent application No. 2010101873612, with English translation.

Japanese Official Notice of Rejection dated Apr. 22, 2014, for Japanese Patent Application No. 2012-244432, with English translation.

* cited by examiner

COFFEE COMPOSITION

CROSS-REFERENCE TO RELATED APPLICATION

This application claims benefit from U.S. Appl. Ser. No. 61/164,056, filed Mar. 27, 2009, which is hereby incorporated by reference in its entirety.

FIELD

The present invention relates to a coffee composition comprising coated ground coffee and a method for making the coffee composition.

BACKGROUND

Coffee compositions can be provided to a coffee consumer in several different forms. Some consumers prefer to be provided with whole roasted coffee beans, which they grind themselves immediately before brewing. Other consumers find it more convenient to be provided with pre-ground roasted coffee, which they then brew. Other consumers prefer using instant coffee.

Some ground coffee compositions contain not only the ground coffee but also additional components. For example, U.S. Pat. No. 6,841,185 describes how a flavouring component can be added to, for example, ground coffee. Other additional ingredients may also be added, including creamers, aroma enhancers, sweeteners and thickeners. In U.S. Pat. No. 6,841,185, the flavouring component and the additional ingredients are mixed with the ground coffee by conventional mixing by allowing the coffee and flavouring particles to tumble over each other.

One problem of providing a coffee composition containing more than just a single coffee component is that, over time, the individual components of the coffee composition segregate and separate from one another. As a result, when the coffee composition is placed in a container and allowed to settle, small components or denser components group together at the bottom of the container while larger or less dense components group together at the top of the container. For example, some components added to a coffee composition are smaller in size than the coffee component of the composition. Thus, an end consumer can experience either an increased concentration of, for example, flavour component or a reduced concentration of the flavour component according to whether the coffee originates from the top or the bottom of the container in which the composition is contained.

U.S. Pat. No. 6,841,185 describes two possible solutions to the problem of segregation. The first solution involves using agglomerated flavouring ingredients so that the size of the flavouring ingredient becomes similar to the size of the coffee in the coffee composition, thereby reducing segregation. The second solution involves using a specific ratio of the sizes of particles of the coffee component to the size of the flavouring component and reportedly controlling the van der Waals interaction between the two components to prevent segregation.

One specific additional component that can be added to ground coffee is instant coffee powder. For example, in EP 0928561, instant coffee powder is added to a ground coffee to decrease the brew time of the coffee composition so that coffee can be made in a vending machine more quickly while maintaining some of the preferred flavour of the ground coffee in the coffee brew. As further examples, EP 0220889, GB 2006603, GB 0229920, U.S. Pat. No. 3,261,689 and U.S. Pat. No. 3,713,842 describe a mixture of ground coffee and instant coffee in which the ground coffee is contacted with a dissolved, aqueous instant coffee, for example by spraying. In U.S. Pat. No. 3,261,689, the spraying is said not to result in agglomeration of the coffee grounds, whereas in U.S. Pat. No. 3,713,842, the spraying is used to purposefully cause agglomeration. Separately, U.S. Pat. No. 2,278,473 suggests the impregnation of exploded coffee particles with molten cane sugar.

SUMMARY

The present invention provides a process of producing grains of coated coffee grounds, the process comprising: heating a mixture of a coating composition and coffee grounds to a temperature below the melting point of the coating composition and at which the coating composition forms a coating on at least some of the coffee grounds; and cooling the mixture to provide grains comprising coffee grounds having a coating comprising the coating composition formed on at least some of the surface of the coffee grounds. The present invention further provides a coffee composition obtainable by a method comprising this process.

The present invention further provides a coffee composition comprising grains of coated coffee grounds, wherein a coating of a coating composition is formed on at least some of the surface of the coffee grounds, wherein the density of the coating is substantially equal to the theoretical density of the coating composition.

The present invention further provides a non-agglomerated coffee composition comprising grains of coated coffee grounds, wherein a coating is formed on at least some of the surface of the coffee grounds, wherein the coating is between 8% and 50% of the total weight of the grains.

The present invention further provides a coffee composition comprising grains of coated coffee grounds, wherein a coating is formed on at least some of the surface of the coffee grounds, wherein at least 80% of the grains by weight have a sieve size of less than 4 mm, and wherein the coating is between 8% and 50% of the total weight of the grains.

BRIEF DESCRIPTION OF THE FIGURES

The present invention is described by way of example in relation to the following Figures.

FIGS. 2 and 3 show results from specific examples of the present invention.

DETAILED DESCRIPTION

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a coffee composition comprising coffee grounds. "Coffee grounds" refers to grains of ground coffee formed by the grinding of coffee beans. A "coffee ground" is a single grain of ground coffee.

Typically, the ground coffee is the product resulting from roasting green coffee beans and grinding the roasted coffee beans. The coffee grounds may be provided as the direct product of the grinding process or may be provided after intermediate processing. When water is added to the coffee grounds, a coffee drink is brewed, typically leaving behind insoluble coffee solids which are filtered from the coffee drink before consumption.

Ground coffee may be produced from any type of coffee bean. Coffee beans (sometimes called coffee cherries) are harvested as the seeds of plants belonging to the plant genus *Coffea*. For example, Arabica coffee is derived from beans from the *Coffea Arabica* plant and Robusta coffee is derived from beans of the *Coffea canephora* plant. Other non-limiting types of coffee include Brazilian coffee and coffee derived from the *Coffea liberica* and *Coffea esliaca* plants. There exist many varieties within individual types of coffee, each variety for example indicating the geographical origin of the coffee. In the present invention, ground coffee derived from any variety or type of coffee or any combination of any varieties and/or types may be used.

Before roasting the coffee, the green coffee beans may be processed. For example, caffeine may be removed from the green coffee beans. Suitable decaffeination processes include treating the beans with a heated coffee extract, direct or indirect decaffeination with a solvent such as dichloromethane, ethyl acetate or triglyceride, and extraction using supercritical carbon dioxide. Other treatment steps before roasting may also be carried out, for example treatment to modulate flavour-producing compounds in the green coffee bean.

The green coffee beans are then roasted. Roasting is well known in the art. Typically, it involves heating the green beans until they change colour. Apparatuses suitable used for roasting include ovens and fluidized beds.

The degree of roasting is judged by the colour of roasted coffee bean. Roasting levels include light roasts (cinnamon, half city, light and New England), medium-light roasts (light American, light city and West coast), medium roasts (American, breakfast, brown, city and medium), medium-dark roasts (full city, light French and Viennese), dark roasts (after dinner, continental, European, French, Italian and New Orleans) and very dark roasts (dark French and heavy).

After roasting, the coffee may be treated, for example to increase (or decrease) its level of hydration. In another example, the coffee may be processed to reflect a unique flavour characteristic such as espresso.

After roasting, the coffee is ground to produce coffee grounds. Grinding methods include burr grinding, chopping, pounding and roller grinding. After grinding, the coffee consists of grains of coffee grounds. Typically, the grounds are free flowing and easily separated from one another. While the grounds may become compacted over time due to settling, typically they are easily removed from their compacted state by minor agitation, for example by shaking a container by hand.

A typical grinding method produces grounds which have an average particle size of 2 mm or less, for example 1.5 mm or less, such as 1.2 mm or less. Typically, the coffee grounds have an average particle size of 0.1 mm or more, for example 0.2 mm or more, for example 0.5 mm or more. Thus, in one embodiment, the coffee grounds have an average particle size of 0.20 to 2 mm. This range of size of grounds facilitates the brewing of a coffee of a strength typically desired by a consumer in a time expected by a consumer.

Average particle size (i.e. mean particle size) may be measured using a diffraction spectrometer. A suitable method of using a diffraction spectrometer to measure particle size is described in the examples.

An alternative way of measuring particle size is by sieve measurement. With this measurement, preferably at least 80% by weight of the coffee grounds have a sieve size (which may be measured using Tyler sieves) of 2 mm or less, for example 1.5 mm or less, such as 1.2 mm or less. Typically, at least 80% by weight of the coffee grounds have an average sieve size of 0.1 mm or more, for example 0.2 mm or more, for example 0.5 mm or more. Thus, in one example, 80% by weight of the coffee grounds have a sieve size of 0.20 to 2 mm. For example, the grounds may have 90% by weight or more of grounds satisfying any of these conditions, for example 95% by weight or more. To measure sieve size, a Tyler Rotap machine may be used. For Tyler sieves #30 and smaller sizes, the sieves may be cleaned with high velocity air after each use.

The inventors of the present invention have investigated compositions comprising both ground coffee and additional components. During these investigations, the inventors recognised that segregation is a significant problem that occurs in coffee compositions that contain both ground coffee and additional components. The inventors have then recognised that segregation does not occur in compositions in which the additional components are coated onto the coffee grounds. This is because coating results in the physical attachment of the additional components onto the coffee grounds rather than providing the additional components and the ground coffee as a mixture of different particles.

The inventors have also recognised that a simple mixture of a composition comprising a ground coffee and additional components is inhomogeneous. This means that, even without segregation occurring, the coffee composition varies across its composition so a slightly different coffee is prepared with each serving of the coffee composition. The inhomogeneous nature of the composition is also detrimental to consumer acceptance of the coffee as a genuine ground coffee. Further, the dissimilarity in the appearance of some additional components and ground coffee can create a speckled appearance to the mixture, which is perceived as detrimental by consumers.

During these investigations, the inventors have surprisingly found that, if coffee grounds are mixed with an additional component, it is possible to heat the mixture to a temperature below the additional component's melting point at which the additional component forms a coating on at least some of the coffee grounds. Preferably, this temperature is equal to or above the glass transition temperature of the additional component. The additional component can be termed a "coating composition" to reflect its role in forming a coating over the coffee grains.

In previous studies of mixtures of coffee grounds with additional components such as instant coffee, it has, for example, been an aim to form a matrix of the additional component containing the coffee grounds embedded within the matrix in order to improve the flavour of the instant coffee. For example, EP 0220889 describes a process of forming a matrix of a coffee extract containing coffee grounds comprising freeze drying a mixture of coffee extract and coffee grounds. To take another example, GB 2006603 describes a process of agglomerating finely ground coffee with soluble coffee.

The inventors of the present invention have now found that embedding coffee grounds in a matrix is not the only way of providing a mixture of coffee grounds and an additional component. Instead, the inventors have found that it is possible to provide a composition comprising coated coffee grounds in which the individual particles in the coffee grounds maintain essentially their own individual identity or, in other words, in which the particles of the coffee grounds are essentially individually coated. Thus, a ground coffee composition may be provided in which the additional component flavours the ground coffee rather than, as in some of the prior art, the ground coffee acting to flavour the additional component.

Without wishing to be bound by theory, the inventors propose that a combination of factors facilitate the production of coated coffee grounds rather than a continuous matrix embedding the coffee grounds.

Firstly, by using a relatively low weight ratio of coating composition to coffee grounds, the inventors have found that the coating of the coating composition onto the coffee grounds is favoured. For example, preferably the coating composition is provided in the process of the present invention in a weight ratio of from about 1:1 to about 1:1000. However, it is foreseen that compositions having higher weight ratios of coating composition to coffee grounds may be formed by control of the processing conditions. For example, by controlling the heating to close to the glass transition temperature of the coating composition (as discussed below) and/or by continuously mixing the composition during the coating procedure, coating of larger proportions of the coating composition onto the coffee grounds may be facilitated. In addition, gentle shaking of the composition after it has been heated to the coating temperature may break loose any weak connection between grains that may have formed during the heating process.

In addition, the process of the present invention may be facilitated by attractive forces between the coating composition and the coffee grounds. These attractive forces may contribute to the coating composition forming a coating around individual grains of the coffee grounds rather than forming a matrix embedding the coffee grounds. These attractive forces may be operating while the mixture is being heated to the coating temperature and/or beforehand to provide adhesion of the coating composition to the coffee grounds.

For example, the inventors have recognised that the oils in the coffee grounds may contribute to the adhesion of particles of coating composition to the surface of the coffee grounds. The amount of oils at the surface of the coffee grounds may be controlled by, for example, controlling the roasting length and temperature and, for example, by post-roasting treatment of the coffee grounds. It is contemplated that other methods such as the addition of oily substances may also be used to contribute to the 'oily' surface of the coffee grounds.

Furthermore, the tackiness of the coating composition may facilitate the coating of the coating composition onto the coffee grounds. For example, it is known that instant coffee and other coating compositions may contain monosaccharides and/or disaccharides. These can give the instant coffee a 'sticky' feel. This tackiness may contribute to the attractive forces between the coffee grounds and the coating composition.

The inventors of the present invention also contemplate that electrostatic adhesion may be used to facilitate the coating process. For example, friction charging of the coffee grounds may occur during the grinding of the coffee and subsequent mixing of the freshly ground coffee with the coating composition may result in weak adhesion of the coating composition to the coffee grounds, which is converted to coated coffee grounds on heating.

Accordingly, the coating of the coating composition onto coffee grounds may be performed by the following steps:

(1) heating a mixture of a coating composition and coffee grounds to a temperature below the melting point of the coating composition and at which the coating composition forms a coating on at least some of the coffee grounds; and then (2) cooling the mixture to provide grains of coated coffee grounds having a solid coating.

The temperature to which the mixture is heated in step (1) is referred to herein as the coating temperature. This temperature is below the melting point of the coating composition, the melting point being the temperature at which the coating composition becomes liquid. If the coating composition contains more than one component, the coating temperature is below the lowest melting point of any of the components of the coating composition. Melting point is measured by methods readily known to the person skilled in the art, for example with a conventional melting point apparatus. Another specific method for measuring melting point is Differential Scan Calorimetry, as further described herein. It is noted that a method of exposing coffee grounds to a coating composition comprising a coating dissolved in a liquid involves exposing the coffee grounds to a coating composition above its melting point because the overall coating composition is liquid during coating. The coating temperature is less than the melting point of the coating composition because otherwise the inventors have found that the coating composition tends to flow freely and form a matrix embedding the coffee grounds.

In the process of the present invention, the weight ratio of the coating composition to the coffee grounds is preferably from about 1:1 to about 1:1000. For example, the weight ratio may be from about 1:3 to about 1:100, such as from about 1:4 to about 1:40, for example 1:5 to about 1:50, such as from about 1:1 to about 1:10. Within these ranges, the coating composition may have a tendency not to form a matrix but instead to form a coating on individual coffee grounds.

As noted previously, working within these ranges may facilitate the coating of the coating composition onto the coffee grounds. In particular, below the lower limits, the effect of the additive on the properties of the overall composition may be reduced; above the upper limits, the ease of coating the coating composition onto the coffee grounds without forming a matrix is reduced. It is recognised that, while most of the coating composition may end up coating the coffee grains, a proportion (e.g. 20 wt % or less, such as 10 wt %, such as 5 wt % or less) of the original coating composition may remain uncoated on the coffee grounds after coating and remain separate from the coffee grounds. This remaining coating composition can either be separated from the coated coffee grounds or it can be allowed to remain dispersed in the coffee grounds. The amount of uncoated coating composition may be reduced by mixing during heating at the coating temperature.

The coating composition may be provided as a solid at room temperature (about 20° C.). The coating composition may be a single substance or a mixture of substances. At least one component of the coating composition may have a glass transition temperature of 150° C. or below. Glass transition temperature may be measured by Differential Scan Calorimetry (DSC). Preferably, one component of the coating composition has a glass transition temperature of 100° C. or below, preferably 75° C. or below, preferably 60° C. or below. Preferably, these glass transition temperatures represent the lowest glass transition temperature of the coating composition. These upper limits of glass transition temperatures are preferred so that the coating may be performed without the possibility of the coffee grounds undergoing further roasting during coating.

Preferably, the coating composition has its lowest glass transition temperature at 25° C. or greater in order to prevent caking of the composition during storage, preferably 30° C. or greater, such as 35° C. or greater. Thus, while the term "solid" includes within its scope a substance above its glass transition temperature but below its melting point, the coating composition preferably has its lowest glass transition temperature above room temperature (about 20° C.).

For example, the glass transition temperature of the coating composition (preferably the lowest glass transition temperature of the composition) may preferably be 30 to 100° C., such as 30° C. to 75° C. The inventors have found that providing a coating composition having a glass transition temperature within this range allows the coating of the coating composition to occur without adverse degradation of coffee aromas during heating.

Preferably, at least 20% by weight of the coating composition provided before coating the coffee grounds has a glass transition temperature within the above ranges. Preferably, at least 50% by weight has these glass transition temperatures, more preferably 80%, such as 90%, for example about 100% by weight. In particular, a higher amount of the coating composition that has a glass transition temperature within the above ranges may result in the more controlled and more even coating of the coating composition onto the coffee grounds.

Preferably, the coating composition comprises one or more ingredients selected from the group consisting of a coffee extract, a tea extract, a dairy product, a sweetener, and a nutritional supplement. The inventors have found this selection of ingredients to be particularly suited as coating compositions. Preferably, these ingredients are chosen so that the composition has a $T_g$ as defined above. Preferably, the coating composition is or comprises a coffee extract or a tea extract, which the inventors have found to be versatile in their use as a coating composition. Preferably, the coating composition is or comprises a coffee extract.

The coating composition may comprise a coffee extract. The term "coffee extract" is well known in the art. The coffee extract may be selected to have a glass transition temperature within the ranges described herein.

Typically, coffee extracts are extracts obtained from coffee by extraction with a solvent, for example water. Coffee extracts may be also obtained by other methods, for example by freeze-drying coffee. Instant coffee, also known as soluble coffee, is an example of a coffee extract suitable for use in the present invention. Instant coffee may be provided for example as freeze-dried coffee or spray-dried coffee.

The coating composition may comprise a tea extract. The term "tea extract" is also well known in the art. The tea extract may be selected to have a glass transition temperature within the ranges described herein.

Typically, team extracts are extracts obtained from tea with a solvent, for example water. The extract may be obtained from any type of tea, for example from green tea.

The coating composition may comprise a dairy product. The dairy product may comprise one or more dairy proteins, such as proteins originating from a cow source. For example, the coating composition may comprise a creamer or a whitener. The dairy product may be selected to have a glass transition temperature within the ranges described herein.

The coating composition may comprise a sweetener. The sweetener may be selected to have a glass transition temperature within the ranges described herein.

The coating composition may comprise a nutritional supplement. The term nutritional supplements (also known as dietary supplements) is well known to the person skilled in the art as a product that is intended to supplement the diet. For example, dietary supplements can be classed according to the US Dietary Supplement Health and Education Act of 1994. Dietary supplements include minerals, dietary fibres, biochemical precursors and plant sterols. The nutritional supplement may be selected to have a glass transition temperature within the ranges described herein.

The nutritional supplement may comprise one more minerals. Minerals are typically inorganic salts, for example salts containing group 1 and/or group 2 elements of the periodic table and/or one or more halogens and/or sulphate. For example, the minerals may comprise one or more potassium and/or calcium salts.

The nutritional supplement may comprise dietary fibre. The dietary fibre is preferably soluble dietary fibre. The dietary fibre may a polymer comprising monomer units of one or more of sugars, such as one or more of fructose, glucose and mannose. The polymer may, for example, comprise 10 to 10,000 monomer units, for example 10 to 1000 monomer units, such as 20 to 200 monomer units, for example 20 to 60 monomer units. If provided as a copolymer, the copolymer may be a random copolymer or a block copolymer.

For example, the dietary fibre may comprise a fructan, for example inulin. The dietary fibre may comprise a glucan, for example a beta-glucan and/or Fibersol. The dietary fibre may comprise a mannan oligo-saccharide (MOS).

The nutritional supplement may comprise a biochemical precursor. For example, the biochemical precursor may be glucosamine-HCl.

The nutritional supplement may comprise a plant sterol. For example, the coating composition may comprise phytosterol.

It will be appreciated that one or more ingredients may be combined to form a suitable coating composition. For example, the coating composition may comprise a coffee extract and/or a tea extract and optionally one or more selected from the group consisting of a dairy product, a sweetener, and a nutritional supplement.

For example, the coating composition may be provided as a mixture of powders. In this case, preferably any ingredient having a $T_g$ greater than temperature to which to the mixture of the coating composition and coffee grounds is heated has a mean particle size that is less than half of the mean particle size of the ingredient(s) having a $T_g$ below the temperature to which the mixture of the coating composition and the coffee grounds is heated, more preferably a third or less, such as a quarter or less, for example a fifth or less. For example, preferably any ingredient having a $T_g$ greater than 60° C. (or no $T_g$ at all), for example greater than 75° C., such as greater than 100° C., for example 150° C. or greater, has this mean particle size. For example, the ingredients apart from coffee extract and/or tea extract may have a particle size as defined above.

Alternatively or additionally, the different ingredients may be pre-blended so that they are contained the same particles.

The coating composition preferably comprises one or more monosaccharide and/or disaccharides to contribute to its tackiness to facilitate the coating process. For example, the content of monosaccharide and disaccharides in the coating composition may be 0.5 wt % or more, such as 1 wt % to 50 wt %, such as 5 wt % to 25 wt %. The upper limits help to control any sweet taste that may be provided by the addition of a coating composition comprising monosaccharide and/or disaccharides to the ground coffee. For example, the inventors have found the tackiness of coffee extracts and tea extracts that result from their saccharide content facilitate the coating of these substances onto ground coffee.

In one embodiment, the coating composition comprises an extract of coffee, for example instant coffee. Methods of providing instant coffee are well known in the art. The instant coffee may be freeze-dried coffee or spray-dried coffee.

In the present invention, the coating composition and the coffee grounds are mixed together. Many methods of mixing are known in the art, for example allowing each component to tumble over one another to provide a relatively uniform distribution of components amongst one another.

The mixture formed by mixing is heated. For example, mixing can occur prior to heating or it can occur while being heated. The mixture is heated to a temperature below the melting point of the coating composition and at which the coating composition forms a coating on at least some of the coffee grounds. For example, the mixture can be heated to a temperature substantially equal to or greater than the glass transition temperature of the coating composition. The mixture is heated to a temperature at which none of the components in the coating composition is liquid (e.g. less than 160° C., for example less than 100° C., such as less than 60° C.). If the coating composition comprises several individual components having different glass transition temperatures, the mixture may be heated to a temperature substantially equal to or greater than the glass transition temperature of at least one of the components, for example the lowest glass transition temperature of the coating composition.

For example, the mixture may be heated to a coating temperature of 30° C. to 160° C., for example 30° C. to 110° C., such as 30° C. to 80° C. For example, the mixture may be heated to 35° C. to 60° C. At these temperatures, the coating process may be facilitated without additional roasting of the coffee grounds.

Preferably, the mixture may be heated to a coating temperature of between 5 and 50° C. of the glass transition temperature of the coating composition. The lower limit can help the coating composition to perform its role in coating. The upper limit can prevent uneven coating of the ground coffee and facilitate the actual coating of the coffee grounds rather than the formation of a matrix embedding the coffee grounds. For example, the mixture may be heated to a temperature of 40° C. or less of the glass transition temperature of the coating composition, for example 30° C. or less, such as 20° C. Equally, the mixture may be heated to a temperature of 10° C. or more of the glass transition temperature of the coating composition, for example 15° C. or more. It will be understood that the glass transition temperature of a coating composition may be controlled by, for example, the control of moisture content so that it lies within a desired temperature range for coffee processing.

It is noted that mixture used in the process of the present invention may be heated to the softening point of the coating composition. For example, the softening point may be below the glass transition temperature. The softening point may be measured by the Vicat A test. In order to lower the softening point of the coating composition, the coating composition may be pre-treated to increase its tackiness. For example, the coating composition may be pre-treated with a humid atmosphere. For example, the tackiness of coating compositions comprising a monosaccharide and/or a disaccharide and/or citric acid may be increased by exposing to a humid atmosphere.

The length of time of the heating may depend on the actual temperature of heating and the conditions under which heating is carried out. Typical heating times may be 30 minutes or greater, for example 2 hours or greater, for example 6 hours or greater, such as 24 hours or greater. For the sake of convenience, a maximum heating time may be 2 weeks or less, for example 1 week or less. Thus, a typical length of heating may be 1 hour to 2 weeks.

Mixing of the mixture of coating composition and the coffee grounds may be carried out while heating to the coating temperature. This mixing may facilitate the coating of the coating composition onto the coffee grounds rather than the formation of matrix embedding the coffee grounds, especially at higher weight ratios of coating composition to coffee grounds.

In order to prevent further reaction of the ground coffee, the heating may be carried out under an inert atmosphere. For example, the heating may be carried out in an oxygen-free atmosphere, such as one containing 0.5 vol. % or less of oxygen, for example 0.1 vol. % or less, for example 0.01 vol. % or less. In addition, in order to prevent additional roasting of the coffee, the temperature at which the coating is carried out may be controlled to within the ranges described above.

Typically, the coating composition is provided in particle form. The coating composition may be provided having a mean particle size (e.g. measured using a diffraction spectrometer) that is 50% or less the particle size of the coffee grounds that is used, for example 30% or less, for example 25% or less.

Typically, the coating composition has a mean particle size of 3 mm or less, for example 1 mm or less, for example 0.5 mm or less, such as 0.3 mm or less. For example, if the particle size is measured by sieve measurement, preferably at least 80% by weight of the coating composition may have a particle size of 3 mm or less, for example 1 mm or less, for example 0.5 mm or less. For example, at least 90% by weight or more of the coating composition may have a particle size within this range, for example 95% by weight or more.

A particle size below these limits (whether measured by diffraction or by sieve size) may facilitate the coating of the coating composition onto the coffee grounds. In addition, a smaller particle size may result in a proportionately larger attractive force between the particles of the coating composition and the ground coffee because they have a higher surface area to volume ratio, thereby further facilitating the coating of the coating composition onto the coffee grounds. However, in some cases, too small a particle size can be difficult to handle. Therefore, the mean particle size (either measured by diffraction or by sieve size as referred to previously) may be 0.01 mm or greater, such as 0.05 mm or greater, for example 0.1 mm or greater. Accordingly, a preferred range of particle size of the coating composition is about 0.01 mm to about 1 mm, such as 0.05 mm to 0.5 mm.

In the present invention, an instant coffee having a particle size smaller than the coffee grounds may be advantageously used. Thus, spray-dried coffee, preferably having a particle size of 0.5 mm or less, for example 0.3 mm or less, is ideal for use in the present invention.

After cooling, additional process steps may be used. For example, weak shaking of the grains formed may help loosen any weak adhesion between neighbouring grains that may have formed, for example, at high loadings of the coating composition onto the coffee grounds. Other additional process steps include separating any remaining coating composition that has not coated coffee grounds; and further physical or chemical processing to, for example, modulate the flavour of the coffee and/or extend the shelf-life of the coffee and/or modulate the surface properties of the coffee (e.g. by adjusting the hydration level of the coffee). Furthermore, the coating process of the present invention may be carried out more than once (e.g. twice or three times) so that two or more coating compositions are layered onto coffee grounds.

Turning to the product formed by the coating method of the present invention, the coating that is formed over individual coffee ground may completely cover the coffee grounds or it may partially cover the grounds. For example, it may cover all of or substantially all of each of the grounds. Thus, the coating may encase or encapsulate the coffee grounds. The amount of covering of coating over the grounds may be measured by optical microscopy.

In one embodiment, all or substantially all of the coffee grounds are encapsulated individually in the coating material. For example, at least 80% of the particles (the grounds) by weight may be individually encapsulated in the coating material. Encapsulation may be achieved by using conditions to form the coating the encourage a uniform thickness of the coating, for example heating to a temperature closer to the glass transition temperature. Encapsulation may be advantageous because it may provide a protective coating to the coffee grounds to help increase the shelf-life of the product. Encapsulation using the method of the present invention may be more easily achieved than using, for example, spraying a dissolved coating onto coffee grounds because of the controlled nature of the coating process of the present invention.

The coffee composition that is provided by the present invention is provided as grains (i.e. in granular or particulate form). This granular composition may be provided in non-agglomerated form. Thus, each of the grains of the coffee composition may contain only a few coffee grounds, preferably only one. For example, preferably the mean number of coffee grounds contained in each grain of the coffee composition is 5 or less, preferably 3 or less, for example 2 or less. This may provide reliable brewing of the coffee that is expected and acceptable to the consumer.

Typically, the grains of the coffee composition have a particle size that is of the same order of magnitude as the particle size of the coffee grounds contained in the grains. For example, the grains may have an average particle size that is 2.5 times or less the average particle size of the coffee grounds contained in the grains, such as 1.5 times or less, 1.3 times or less, for example 1.2 times or less, for example 1.1. times or less. For example, the grains of the coffee composition may have a mean particle size of 5 mm or less, for example 3 mm or less, such as 2 mm or less, for example 1 mm or less.

In terms of sieve size, at least 80% by weight of the grains of the coffee composition may typically have a sieve size (which may be measured using Tyler sieves) of 5 mm or less, for example 3 mm or less, such as 2 mm or less, for example 1 mm or less. For example, the grains may have 90% by weight or more of grains satisfying this conditions, for example 95% by weight or more.

Agglomeration tends to result in diffuse, loosely-formed particles. These loosely-formed particles tend to be difficult to handle and require a greater volume of coffee to be added to obtain the same brew strength of an equivalent non-agglomerated coffee. In contrast, the coffee composition containing the grains of coated coffee grounds of the present invention may have a density of 0.2 $g/cm^3$ or greater, for example 0.25 $g/cm^3$ or greater, such as 0.35 $g/cm^3$ or greater or 0.4 $g/cm^3$ or greater, for example 0.45 $g/cm^3$ or greater. However, the coffee composition of the present invention is preferably not densely packed, dense packing tending to result in a slow brew. For example, the composition may have a density of 0.55 $g/cm^3$ or less, for example 0.50 $g/cm^3$ or less.

To measure density, a free flow density apparatus may be used. For example, a 5 inch round hopper with a control gate at the bottom may feed into 4 inch cubed Lucite cubes, calibrated for weight and volume. Coffee is loaded into the hopper to within one inch of its top and then the slide gate is opened. The hopper is then allowed to empty and the cube is allowed to overflow freely. Excess coffee is carefully struck off by a pushing, sawing motion without tapping until the sample is level with the top of the cube. The weight of the coffee in the cube is then measured and the density is calculated.

In the composition of the present invention, preferably the granules comprise from about 0.1 to about 50 weight % of the coating (which is formed of the coating composition). More preferably, the granules comprise from about 1 to about 25 weight % of the coating, such as from about 2 to about 20 weight %.

It is noted that the process of the present invention is capable of providing a greater weight % of coating than, for example, spraying a coating onto the granules. Thus, advantageously a greater loading of coating onto the granules may be provided. Accordingly, in one embodiment, the granules comprise from about 8 weight % of the coating composition, such as from about 10 weight % of the coating composition. However, providing a coating by immersing in a melted coating composition tends to result in a high loading of the coating. This can dominate the flavour of the coffee grounds and affect the brew time of the coffee grounds by providing a significant barrier for the brew to reach the coffee grounds. Accordingly, the granules may comprise up to about 50 weight % of the coating composition, such as up to about 25 weight % of the coating composition, for example about 20 weight % of the coating composition.

The inventors have found that the coffee composition of the present invention may have several particular properties. Firstly, the coffee composition may be provided in a non-agglomerated form. This better replicates the appearance of regular ground coffee. The non-agglomerated nature of the coffee may be reflected in the coffee having an average particle size of 5 mm or less.

Secondly, the density of the coating of the coffee composition may be substantially equal to the theoretical density of the coating composition. In particular, the inventors have found that a composition that is sprayed onto ground coffee may be diffuse and somewhat porous. Without wishing to be bound by theory, this may be because of evaporating solvent leaving voids in the coating. Similarly, solidifying a melted coating may form voids at the surface of the coating due to, for example, contracting on solidifying. In contrast, the coating of the present invention may be provided with a denser coating. This denser coating may add to the protective nature of the coating and increase the adherence of the coating onto the coffee grounds.

For example, a coating having a density that is substantially equal to the theoretical density of the coating composition may be deposited by the process described herein. For example, the density of the coating may be within 10% of the theoretical density of the coating, for example within 5% of the theoretical (i.e. bulk) density, for example within 3%. The density of the coating compared to the bulk density of the coating composition may be calculated by measuring the density of voids on the surface of the grains by microscopy. In other words, the void density in the coating may be 10% or less, for example 5% or less, for example 3% or less.

Thirdly, the method described herein to coat the coffee is much simpler than, for example, spraying ground coffee with a coating composition because it does not require an additional processing step to evaporate solvent in order to dry the product.

The coffee composition of the present invention may include only the coating composition and the coffee grounds. Alternatively, the composition may include further additional components not coated onto the coffee grounds. For example, the composition may include or further include flavouring additives, creamers, aroma enhancers, sweeteners and/or thickeners. These additional components may be added after the coating of the coating composition onto the coffee grounds.

EXAMPLES

The present invention will now be described in relation to several examples, which should not be construed as limiting on the scope of the invention.

The following compositions were provided:
(A) soluble spray-dried coffee powder
(B) green tea extract The thermal characteristics of these were measured by Differential Scan Calorimetry (DSC). DSC may be carried out using an instrument obtainable from Perkin Elmer, for example using their 'Hyper DSC' machine. An example of a scan rate at which scanning may be performed is 2° C./minute.

Using DSC, the following glass transition temperatures ($T_g$) were measured. The glass transition temperature was measured a TA Instruments DSC Model 2920 fitted with a Dual Sample Cell. Samples were placed into hermetically sealed aluminum pans and scanned against an empty reference pan. The scan rate was 5° C. per minute and the analyzed temperature range was 0° C. to 125° C. The curves were analyzed using TA Instruments Universal Analysis Program. The glass transition was identified by a step transition (baseline shift) and the inflection point of the curve is the reported critical temperature.

It was noted that the $T_g$ of both of these compositions could be controlled by exposing the compositions to humidity at room temperature (20° C.):

| Composition | Pre-treatment | $T_g$ (° C.) |
|---|---|---|
| (A) | None | 60 |
| | 24 hours at 33% relative humidity | 43 |
| | 55 hours at 33% relative humidity | 8 |
| | 75 hours at 33% relative humidity | −29 |
| (B) | None | 102 |
| | 24 hours at 33% relative humidity | 83 |
| | 55 hours at 33% relative humidity | 49 |
| | 75 hours at 33% relative humidity | 24 |

These compositions were then mixed with ground roasted coffee (R&G coffee).

Then, the following mixtures were prepared:
(C) a mixture of 87 weight % ground coffee+13 weight % spray-dried soluble coffee powder
(D) a mixture of 97 weight % ground coffee+3 weight % green tea extract These mixtures were then heated. Before heating, the appearance of the mixtures was one containing two distinct components. After heating, powders resembling ground roast coffee was produced, appearing to be made up of a single component.

Figure 1:
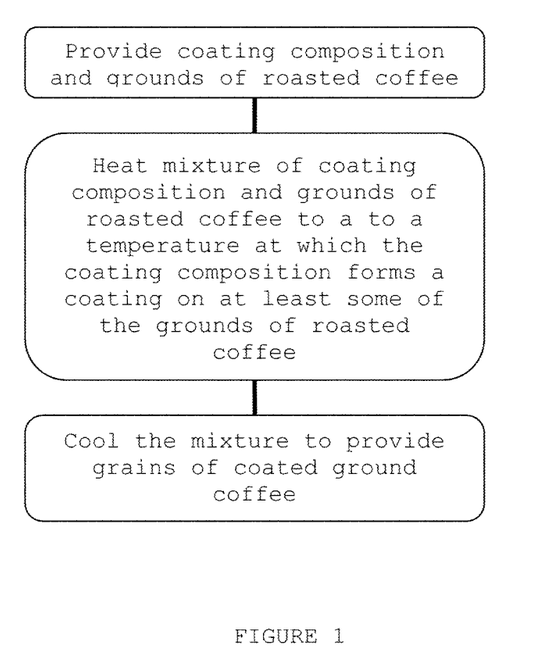
FIG. 1 is a flow-diagram of a process according to the present invention.
Figure 2A:
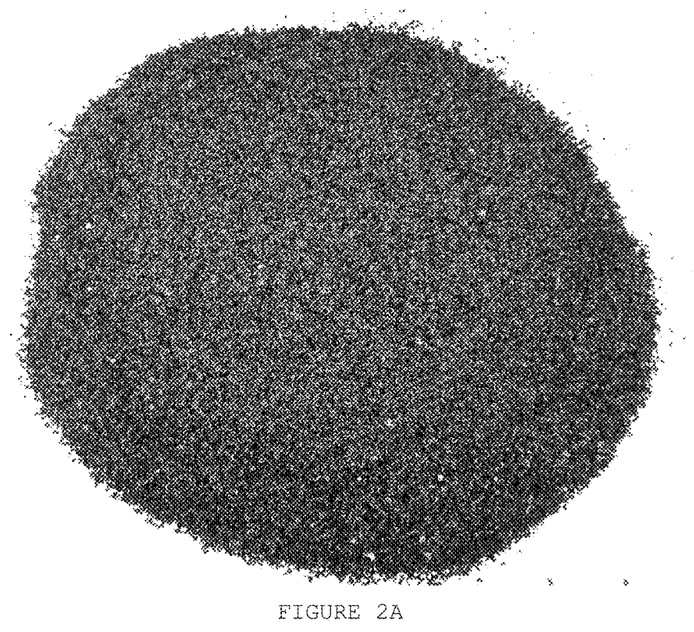
Figure 2B:
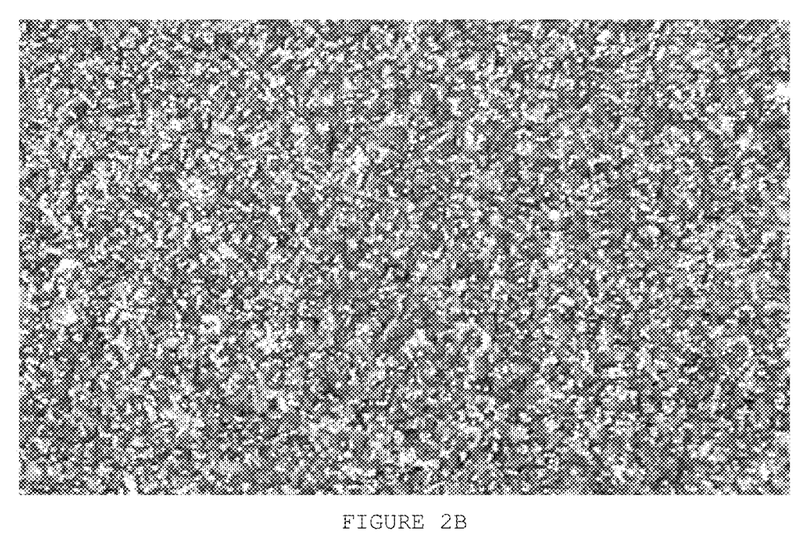
FIG. 2B is a close-up of FIG. 2A
Figure 3A:
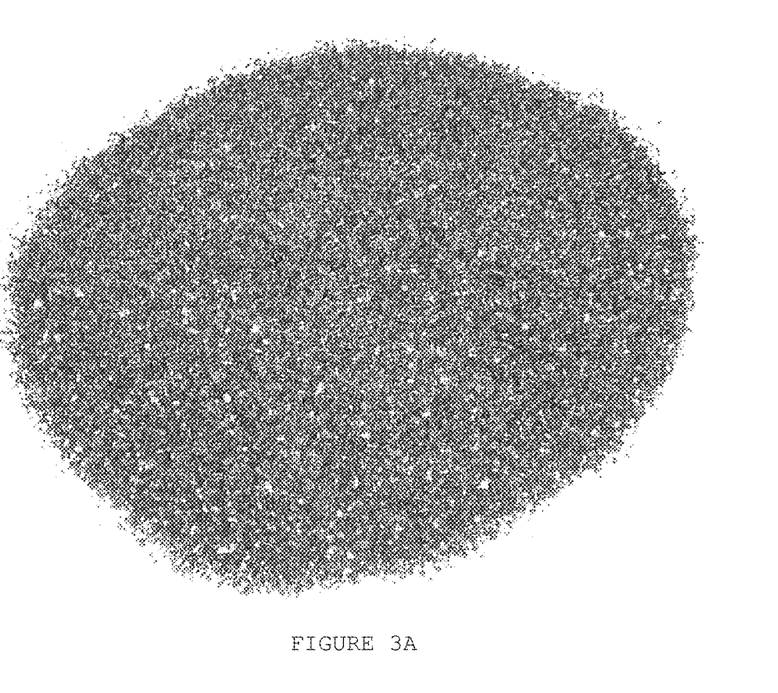
Figure 3B:
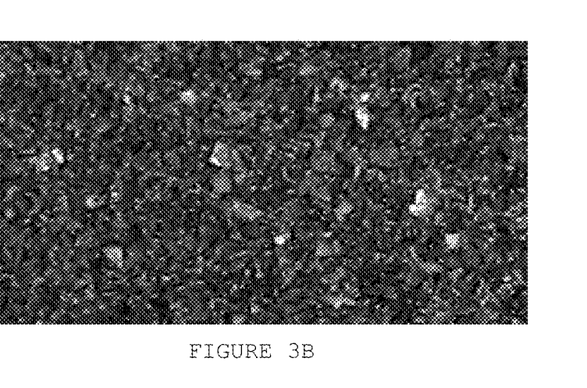
FIG. 3B is a close-up of FIG. 3A.

In one particular example, a spray-dried soluble coffee powder having a $T_g$ of between 30 and 40° C. was used in mixture (C). One half of the mixture was heated at 40° C. for a week while the other half of the mixture was heated at 20° C. for a week. The results are shown in FIGS. 2 and 3 respectively with FIG. 2B being a close-up of FIG. 2A and FIG. 3B being a close-up of FIG. 3A. These Figures show that the mixture heated at 40° C. has an appearance similar to that of regular ground roasted coffee whereas the mixture heated at just 20° C. has a segregated appearance in which the two individual components of the mixture are visible.

The change in particle size of composition (C) was then measured by using a diffraction spectrometer. In particular, the Sympatec Helos/LAlaser diffraction spectrometer having a 2000 mm optical system set with a focal length of 2000 mm and a time resolution of 1000 ms was used. It was used with software package version 4.7.23 supplied by Sympatec Inc. from Princeton, N.J. It was operated with an air pressure of 1.0 bar on the Rodos and an injector depression setting to provide 50 mbar (a setting of 5). The Rodos nozzle was centred on the laser beam at 5 mm from the edge of the beam. Measurements were carried out at room temperature (20° C.) and pressure (1 atmosphere). The system can accommodate 70 to 80 grams of coffee in its feed funnel. The output data was provided as a table of size distribution. These were then averaged by number to obtain a mean particle size.

| | Particle Size (μm) |
|---|---|
| Roast and ground coffee | 780 |
| Finished Product | 848 |
| % Change | +8.7% |

The invention claimed is:

1. A process of producing grains of coated roasted coffee grounds, the process comprising:
heating a mixture of a coating composition having at least one component with a glass transition temperature from about 30° C. to about 60° C. and roasted coffee grounds to a temperature of about 35° C. to about 65° C. and which has to be above the glass transition temperature of the at least one component in the coating composition and below a melting point of the coating composition so that the coating composition forms a coating on at least some of the roasted coffee grounds without the roasted coffee grounds undergoing further roasting during the heating;
cooling the mixture to provide grains comprising roasted coffee grounds having a coating of the coating composition formed on at least some of the roasted coffee grounds where a density of the coating composition after coating is substantially equal to a density of the coating composition before coating; and wherein the coating composition comprises one or more component(s) selected from the group consisting of instant coffee, a coffee extract, a tea extract, a dairy product, a sweetener, a nutritional supplement, and mixtures thereof.

2. The process of claim 1, wherein the coating composition comprises instant coffee.

3. A process of producing grains of coated roasted coffee grounds, the process comprising:

heating a mixture of a coating composition having at least one component with a glass transition temperature from about 30° C. to about 60° C. and roasted coffee grounds to a temperature of about 35° C. to about 65° C. and which has to be above the glass transition temperature of the at least one component in the coating composition and below a melting point of the coating composition so that the coating composition forms a coating on at least some of the roasted coffee grounds without the roasted coffee grounds undergoing further roasting during the heating;

cooling the mixture to provide grains comprising roasted coffee grounds having a coating of the coating composition formed on at least some of the roasted coffee grounds where a density of the coating composition after coating is substantially equal to a density of the coating composition before coating;

wherein the coating composition comprises one or more component(s) selected from the group consisting of instant coffee, a coffee extract, a tea extract, a dairy product, a sweetener, a nutritional supplement, and mixtures thereof; and wherein the glass transition temperature of the at least one component is measured by Differential Scan Calorimetry.

4. The process of claim 3, wherein the temperature to which the mixture is heated is 5 to 30° C. greater than the glass transition temperature, as measured by Differential Scan Calorimetry.

5. The process of claim 1, wherein the heating is carried out in an atmosphere that is free from oxygen.

6. The process of claim 1, wherein the coating composition comprises particles, and wherein a mean particle size of the coating composition is half or less of a mean particle size of the roasted coffee grounds.

7. The process according to claim 1, wherein a ratio of the weight of the coating composition to the roasted coffee grounds is from about 1:1 to about 1:1000.

8. The process of claim 1, wherein the coating composition is a mixture of components including the at least one component having the glass transition temperature between about 30° C. and about 60° C. and at least another component having a glass transition temperature greater than the temperature to which the mixture of the coating composition and the roasted coffee grounds is heated.

9. The process of claim 8, wherein the component having the glass transition temperature greater than the temperature to which the mixture is heated has a mean particle size less than half of a mean particle size of the component having the glass transition temperature between about 30° C. and about 60° C.

10. The process of claim 9, wherein the component having the glass transition temperature between about 30° C. and about 60° C. is selected from one of the group consisting of the coffee extract, the tea extract, and mixtures thereof, and the component having the glass transition temperature greater than the temperature to which the mixture is heated is selected from one of the group consisting of the dairy product, the sweetener, the nutritional supplement, and mixtures thereof.

11. A process of producing grains of coated roasted coffee grounds, the process comprising:

heating a mixture of a coating composition having at least one component with a glass transition temperature from about 30° C. to about 60° C. and roasted coffee grounds to a coating temperature of about 5° C. to about 30° C. greater than the glass transition temperature of the at least one component in the coating composition without exceeding 65° C. and being below a melting point of the coating composition so that the coating composition forms a coating on at least some of the roasted coffee grounds and so that the roasted coffee grounds do not undergo further roasting during the heating;

cooling the mixture to provide grains comprising roasted coffee grounds having a coating of the coating composition formed on at least some of the roasted coffee grounds where a density of the coating composition after coating is substantially equal to a density of the coating composition before coating; and wherein the coating composition comprises one or more component(s) selected from the group consisting of instant coffee, a coffee extract, a tea extract, a dairy product, a sweetener, a nutritional supplement, and mixtures thereof.

12. The process of claim 11, further comprising pretreating the coating composition prior to heating and coating by exposing the at least one component of the coating composition to humidity such that a glass transition temperature is from about 30° C. to about 60° C.

13. The process of claim 11, wherein the coating composition is a mixture of components including the at least one component having the glass transition temperature between about 30° C. and about 60° C. and at least another component having a glass transition temperature greater than the temperature to which the mixture of the coating composition and the roasted coffee grounds is heated.

14. The process of claim 13, wherein the component having a glass transition temperature greater than the temperature to which the mixture is heated has a mean particle size less than half of a mean particle size of the component having a glass transition temperature between about 30° C. and about 60° C.

15. The process of claim 14, wherein the component having a glass transition temperature between about 30° C. and about 60° C. is selected from one of the group consisting of the coffee extract, the tea extract, and mixtures thereof, and the component having a glass transition temperature greater than the temperature to which the mixture is heated is selected from one of the group consisting of the dairy product, the sweetener, the nutritional supplement, and mixtures thereof.

* * * * *